United States Patent
Ding et al.

(10) Patent No.: US 10,676,213 B2
(45) Date of Patent: Jun. 9, 2020

(54) OPTIMAL SAFE LANDING AREA DETERMINATION

(71) Applicant: Sikorsky Aircraft Corporation, Stratford, CT (US)

(72) Inventors: Xuchu Ding, Manchester, CT (US); Jason C. Derenick, Hamden, CT (US); Brendan J. Englot, New York, NY (US); Igor Cherepinsky, Sandy Hook, CT (US); Harshad S. Sane, Southbury, CT (US); Christopher Stathis, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 339 days.

(21) Appl. No.: 15/519,999

(22) PCT Filed: Oct. 16, 2015

(86) PCT No.: PCT/US2015/055864
§ 371 (c)(1),
(2) Date: Apr. 18, 2017

(87) PCT Pub. No.: WO2016/109000
PCT Pub. Date: Jul. 7, 2016

(65) Prior Publication Data
US 2019/0002122 A1    Jan. 3, 2019

Related U.S. Application Data

(60) Provisional application No. 62/065,783, filed on Oct. 20, 2014.

(51) Int. Cl.
*B64D 45/04*     (2006.01)
*G05D 1/06*      (2006.01)
(Continued)

(52) U.S. Cl.
CPC ............ *B64D 45/04* (2013.01); *B64C 39/024* (2013.01); *G05D 1/0676* (2013.01);
(Continued)

(58) Field of Classification Search
None
See application file for complete search history.

(56) References Cited

U.S. PATENT DOCUMENTS

| 8,521,343 | B2 | 8/2013 | Spinelli |
| 8,594,932 | B2 | 11/2013 | McIver et al. |

(Continued)

OTHER PUBLICATIONS

PCT International Search Report and Written Opinion; International Application No. PCT/US2015/055864; International Filing Date: Oct. 16, 2015; dated Jul. 5, 2016; pp. 1-18.

(Continued)

*Primary Examiner* — Genna M Mott
*Assistant Examiner* — Melanie J Patrick
(74) *Attorney, Agent, or Firm* — Cantor Colburn LLP (57) ABSTRACT

According to an aspect of the invention, a method of optimal safe landing area determination for an aircraft includes accessing a probabilistic safe landing area map that includes a plurality of probabilistic indicators of safe landing areas for the aircraft. A processing subsystem that includes one or more processing resources generates a list of candidate safe landing areas based on the probabilistic safe landing area map and one or more constraints. At least two of the candidate safe landing areas are provided to a path planner. The list of candidate safe landing areas is ranked based on results from the path planner indicating an estimated cost to reach each of the candidate safe landing areas. Based on the ranking, an indicator of an optimal safe landing area is output as a desired landing location for the aircraft.

14 Claims, 5 Drawing Sheets

(51) Int. Cl.
*G08G 5/00* (2006.01)
*B64C 39/02* (2006.01)
*G08G 5/02* (2006.01)

(52) U.S. Cl.
CPC ........... *G08G 5/0034* (2013.01); *G08G 5/025* (2013.01); *B64C 2201/141* (2013.01)

(56) References Cited

U.S. PATENT DOCUMENTS

| | | |
|---|---|---|
| 8,600,589 B2 | 12/2013 | Mendez-Rodriguez et al. |
| 8,798,922 B2 | 8/2014 | Tillotson et al. |
| 9,141,113 B1 * | 9/2015 | Ivanov ..................... G05D 1/00 |
| 9,257,048 B1 * | 2/2016 | Offer ..................... G08G 5/0021 |
| 2006/0167599 A1 | 7/2006 | Bodin et al. |
| 2009/0171560 A1 | 7/2009 | McFerran et al. |
| 2010/0039294 A1 * | 2/2010 | Feyereisen ........... G06K 9/0063 |
| | | 340/972 |
| 2010/0204919 A1 | 8/2010 | Becker et al. |
| 2011/0264312 A1 | 10/2011 | Spinelli et al. |
| 2012/0029869 A1 | 2/2012 | Muensterer et al. |
| 2013/0282208 A1 | 1/2013 | Mendez-Rodriguez et al. |
| 2014/0297068 A1 | 10/2014 | Ravell et al. |
| 2014/0379179 A1 * | 12/2014 | Goossen ................. G08G 5/02 |
| | | 701/18 |

OTHER PUBLICATIONS

Scherer, Sebastian et al.; "Autonomous landing at unprepared sites by a full-scale helicopter", Robotics and Autonomous Systems, vol. 60, No. 12, XP055187302, Dec. 2012, pp. 1545-1562.
The extended European search report; Application No. 15875863.1; dated Mar. 13, 2018; pp. 1-7.

* cited by examiner

OPTIMAL SAFE LANDING AREA DETERMINATION

BACKGROUND OF THE INVENTION

The subject matter disclosed herein generally relates to landing of an aircraft, and more particularly to determining an optimal safe landing area for an aircraft.

Optionally-piloted vehicles (OPVs) and unmanned aerial vehicles (UAVs) can operate without a human pilot using autonomous controls. As OPVs and UAVs become more prevalent, they are being operated in less restricted and controlled areas. When OPVs and UAVs are operated autonomously in flight, they must identify a landing area prior to landing. To account for unpredictable landing area conditions, OPVs and UAVs must use a perception system to identify factors that may impede a safe landing. Current art on autonomous landing zone detection has focused on video camera-based vision systems. While images from video cameras can be valuable in identifying a safe landing area, they may not provide enough information to determine suitability of a landing area with a high level of accuracy, particularly where a degree of measurement uncertainty exists.

When a particular landing area is targeted as part of a vehicle mission, such as a medical-evacuation mission, it is possible that the targeted area is unsafe for landing. Selection of a next best alternative landing area and a path to reach it can be difficult, particularly where multiple alternative landing areas exist that involve different paths.

BRIEF DESCRIPTION OF THE INVENTION

According to an aspect of the invention, a method of optimal safe landing area determination for an aircraft includes accessing a probabilistic safe landing area map that includes a plurality of probabilistic indicators of safe landing areas for the aircraft. A processing subsystem that includes one or more processing resources generates a list of candidate safe landing areas based on the probabilistic safe landing area map and one or more constraints. At least two of the candidate safe landing areas are provided to a path planner. The list of candidate safe landing areas is ranked based on results from the path planner indicating an estimated cost to reach each of the candidate safe landing areas. Based on the ranking, an indicator of an optimal safe landing area is output as a desired landing location for the aircraft.

In addition to one or more of the features described above or below, or as an alternative, further embodiments could include where the constraints include one or more of: mission-level constraints and vehicle constraints, such as a minimal spatial clearance for the aircraft. In addition to one or more of the features described above or below, or as an alternative, further embodiments could include where generating the list of candidate safe landing areas is further based on mission-level costs. The mission-level costs and the mission-level constraints can include costs and constraints for the aircraft to traverse a path and for reaching a targeted location after the aircraft has landed.

In addition to one or more of the features described above or below, or as an alternative, further embodiments could include where the constraints further include one or more of: geometric constraints around the targeted location and a minimum confidence level threshold for the candidate safe landing areas.

In addition to one or more of the features described above or below, or as an alternative, further embodiments could include where the estimated cost to reach each of the candidate safe landing areas is defined as one or more of: an estimated distance, an estimated time, an estimated amount of fuel consumption, and a likelihood of safe landing.

In addition to one or more of the features described above or below, or as an alternative, further embodiments could include where generating the list of candidate safe landing areas further includes distributing analysis and comparisons of the probabilistic indicators of the safe landing areas and the constraints between a plurality of the processing resources. The analysis and comparisons of the probabilistic indicators of the safe landing areas and the constraints for multiple safe landing areas can be performed in parallel between the processing resources. In addition to one or more of the features described above or below, or as an alternative, further embodiments could include where the candidate safe landing areas are provided to the path planner as a single multi-goal query, such that a single path-tree is generated once for all of the candidate safe landing areas.

In addition to one or more of the features described above or below, or as an alternative, further embodiments could include receiving sensor data indicative of current conditions at potential landing areas for the aircraft and performing feature extraction on the sensor data. Geospatial partitioning of the sensor data can be performed to subdivide processing of the sensor data into a plurality of cells. Sensor data for the cells can be collected over a period of time. Slope and variance feature values of the cells can be computed based on the sensor data that are collected over the period of time.

In addition to one or more of the features described above or below, or as an alternative, further embodiments could include receiving position data for the aircraft, determining positions of the potential landing areas and the aircraft based on the position data, and correlating the sensor data to the position data.

According to further aspects of the invention, a system is provided for performing an optimal safe landing area determination for an aircraft. The system includes a processing subsystem and memory having instructions stored thereon that, when executed by the processing subsystem, cause the system to access a probabilistic safe landing area map including a plurality of probabilistic indicators of safe landing areas for the aircraft. A list of candidate safe landing areas is generated based on the probabilistic safe landing area map and one or more constraints. At least two of the candidate safe landing areas are provided to a path planner. The list of candidate safe landing areas is ranked based on results from the path planner indicating an estimated cost to reach each of the candidate safe landing areas. Based on the rank, an indicator of an optimal safe landing area is output as a desired landing location for the aircraft.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, an optimal safe landing area (SLA) is determined for an aircraft. Optimal SLA determination may be implemented in whole or in part within autonomous aircraft, such as optionally-piloted vehicles (OPVs) and unmanned aerial vehicles (UAVs), and/or may be provided to assist in landing area determination for a human-piloted aircraft. In exemplary embodiments, data acquired from sensors are used to refine SLA maps. SLA maps, also referred to as "probabilistic SLA maps", may be cellular/grid-based representations of environmental terrain which are iteratively built via discrete-time, cell-based feature measurements. In an embodiment, to enable online probabilistic mapping, the measurements are coupled with probabilistic models capturing the likelihood that a particular measurement or measurements indicates a safe landing area or unsafe landing area. Each cell in a SLA map can be associated with a probability that it represents a safe landing area or an unsafe landing area either in-part (e.g., as part of a larger connected component) or fully. Since each SLA map cell may be assumed to be statistically independent, these probabilities can be readily updated and operated upon in a parallel fashion.

A SLA map can be designed to integrate higher-order cell-based feature measurement which may be readily computed from temporally correlated data of an individual cell. Thus, a SLA map can embed more geospatial and temporal structure than what otherwise could be captured with a single sensor observation. For example, with simplified characterization, a safe landing area may be loosely described as being a geospatially "smooth" and "horizontal" surface. High-order feature measurements may be collected using point-based range observations of a particular cell over some fixed-interval of time before computing "slope" and "variance" feature values, for example. Accordingly, each cell in a SLA map can be associated with its own feature vector having values computed over a specified discrete-time interval. Once new feature values are computed for a particular cell, they can be recursively integrated into the SLA map. Feature values for a particular cell may be computed only using the measurements associated with that cell; however, they may also incorporate measurements from some subset of neighboring cells within some specified or determined proximity. For example, the suitability of a cell for safe landing may be, in part, determined by the "smoothness" of the measurement (or feature) values across cellular boundaries.

An optimal safe landing area for an aircraft can be determined locally within the aircraft, by a remote system, or a distributed combination thereof. For example, a SLA map can be locally accessed or received at a remote processing system for analysis, where the SLA map includes a plurality of probabilistic indicators of safe landing areas for the aircraft. A list of candidate safe landing areas can be generated based on the SLA map and one or more constraints. The constraints can be defined at a mission level and, optionally, a vehicle level. One or more mission-level costs can also be used in developing and limiting the list of candidate safe landing areas. At least two of the candidate safe landing areas can be provided to a path planner to determine a path to each of the candidate safe landing areas. The path planner can include or operate in conjunction with a motion planner to instruct changes in location and orientation of the aircraft. The path planner can return a path and as estimated cost for reaching each of the candidate safe landing areas, provided that the candidate safe landing areas are reachable from the current location of the aircraft. The list of candidate safe landing areas can be ranked based on results from the path planner. Based on the ranking, an indicator of an optimal safe landing area can be output as a desired landing location for the aircraft. The desired landing location and associated path can be relayed to a guidance system of the aircraft such that the aircraft can be directed to the desired landing location along the associated path.

Figure 1:
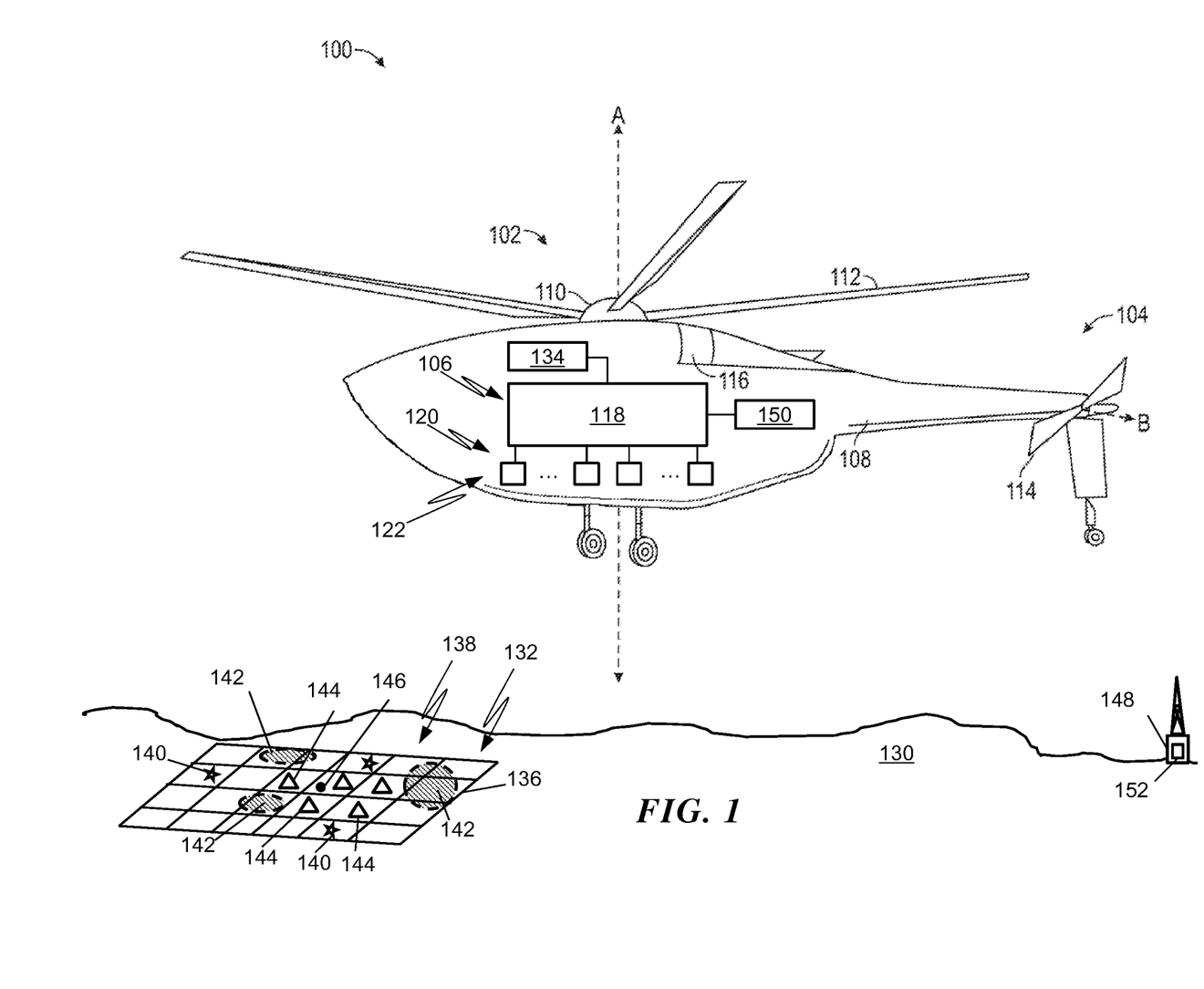
FIG. 1 is a perspective view of an exemplary rotary wing UAV aircraft according to an embodiment of the invention.

Referring now to the drawings, FIG. 1 illustrates a perspective view of an exemplary vehicle in the form of an autonomous rotary-wing unmanned aerial vehicle (UAV) 100 (also referred to as "autonomous UAV 100" or "aircraft 100") for implementing optimal safe landing area determination according to an embodiment of the invention. As illustrated, the autonomous UAV 100 is an aircraft that includes a main rotor system 102, an anti-torque system, for example, a tail rotor system 104, and a SLA determination system 106. The main rotor system 102 is attached to an airframe 108 and includes a rotor hub 110 having a plurality of blades 112 that rotate about axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines 116 through gearboxes (not shown). Although a particular configuration of an autonomous UAV 100 is illustrated as a rotary wing UAV and described in the disclosed embodiments, it will be appreciated that other configurations and/or machines include autonomous, semi-autonomous, and human-controlled vehicles that may operate in land or water including fixed-wing aircraft, rotary-wing aircraft, marine vessels (e.g., submarines, ships, etc.), and land vehicles (e.g., trucks, cars, etc.) for docking, parking, or autonomous positioning may also benefit from embodiments disclosed.

The SLA determination system 106 includes an aircraft computer system 118 having one or more processing resources and memory to process sensor data acquired from a sensing system 120. The sensing system 120 may be attached to or incorporated within the airframe 108. The sensing system 120 includes one or more sensors 122. The aircraft computer system 118 processes, in one non-limiting embodiment, raw data acquired through the sensing system 120 while the autonomous UAV 100 is airborne.

The sensors 122 can capture sensor data of a terrain 130. In an embodiment, the sensors 122 may include one or more of: a downward-scanning LIDAR scanner, a video camera, a multi-spectral camera, a stereo camera system, a structure light-based 3D/depth sensor, a time-of-flight camera, a LADAR scanner, a RADAR scanner, or the like in order to capture sensor data indicative of the terrain 130. Additionally, the autonomous UAV 100 may include a navigation system 134, such as, for example, an inertial measurement unit (IMU) that may be used to acquire positional data related to a current rotation and acceleration of the autonomous UAV 100 in order to determine a geographic location of autonomous UAV 100, including a change in position of the autonomous UAV 100. The navigation system 134 can also or alternatively include a global positioning system (GPS) or the like to enhance positional awareness of the autonomous UAV 100. The navigation system 134 in combination with the sensor data may be used to determine positions or geographic locations of potential landing areas 132.

In exemplary embodiments, the aircraft computer system 118 of the SLA determination system 106 observes the terrain 130 and determines current conditions at the potential landing areas 132 for the autonomous UAV 100. A geospatial grid 136 subdivides and partitions the potential landing areas 132 into a plurality of cells 138 for analysis. The geospatial grid 136 may exist as a data structure in the aircraft computer system 118, with sizing and geographic coordinates defined across an area of the terrain 130 to be observed using the sensors 122. Sensor data for the cells 138 can be collected over a period of time. Using feature extraction for visual information and/or depth information, a probabilistic safe landing area map can be developed and updated based on comparing extracted features of the sensor data with a probabilistic safe landing area model. The aircraft computer system 118 may compute slope and variance feature values of the cells 138 based on the sensor data that are collected over a period of time. As the cells 138 are analyzed, multiple cells 138 may be identified as candidate safe landing areas 140 having probability values indicating a greater likelihood of a smooth and horizontal surface at an expected elevation level.

Various constraints can be applied at a mission level and vehicle level to rule out a number of cells 138 as possible safe landing areas. For example, a number of no-fly zones 142 can be defined within the potential landing areas 132. Known obstacles or impediments to landing can also be identified as safe landing obstacles 144. The safe landing obstacles 144 can include, for instance, rocks, debris, trees, buildings, and the like. A targeted location 146 may not align with one of the candidate safe landing areas 140, and thus further processing may be needed to identify an optimal safe landing area relative to the candidate safe landing areas 140 with respect to the targeted location 146. Determining an optimal safe landing area may be performed locally by the SLA determination system 106 or can be done in whole or in part by a remote computer system 148. For example, the aircraft computer system 118 can transmit a copy of a SLA map for the potential landing areas 132 via a communication interface 150 to the remote computer system 148. The remote computer system 148 can be a ground control station that includes a processing subsystem 152 which implements a path planner to rank a list of the candidate safe landing areas 140 based on an estimated cost to reach each of the candidate safe landing areas 140. Mission-level constraints and costs can be used to develop and rank the list of candidate safe landing areas 140 within the aircraft computer system 118 or the remote computer system 148. When the remote computer system 148 is used for safe landing area optimization, the remote computer system 148 can output an indicator of an optimal safe landing area as a desired landing location for the autonomous UAV 100. The desired landing location and, optionally, an associated path to the desired landing location can be sent from the remote computer system 148 to the communication interface 150 to assist in guiding the autonomous UAV 100 to the optimal safe landing area with respect to the targeted location 146.

Figure 2:
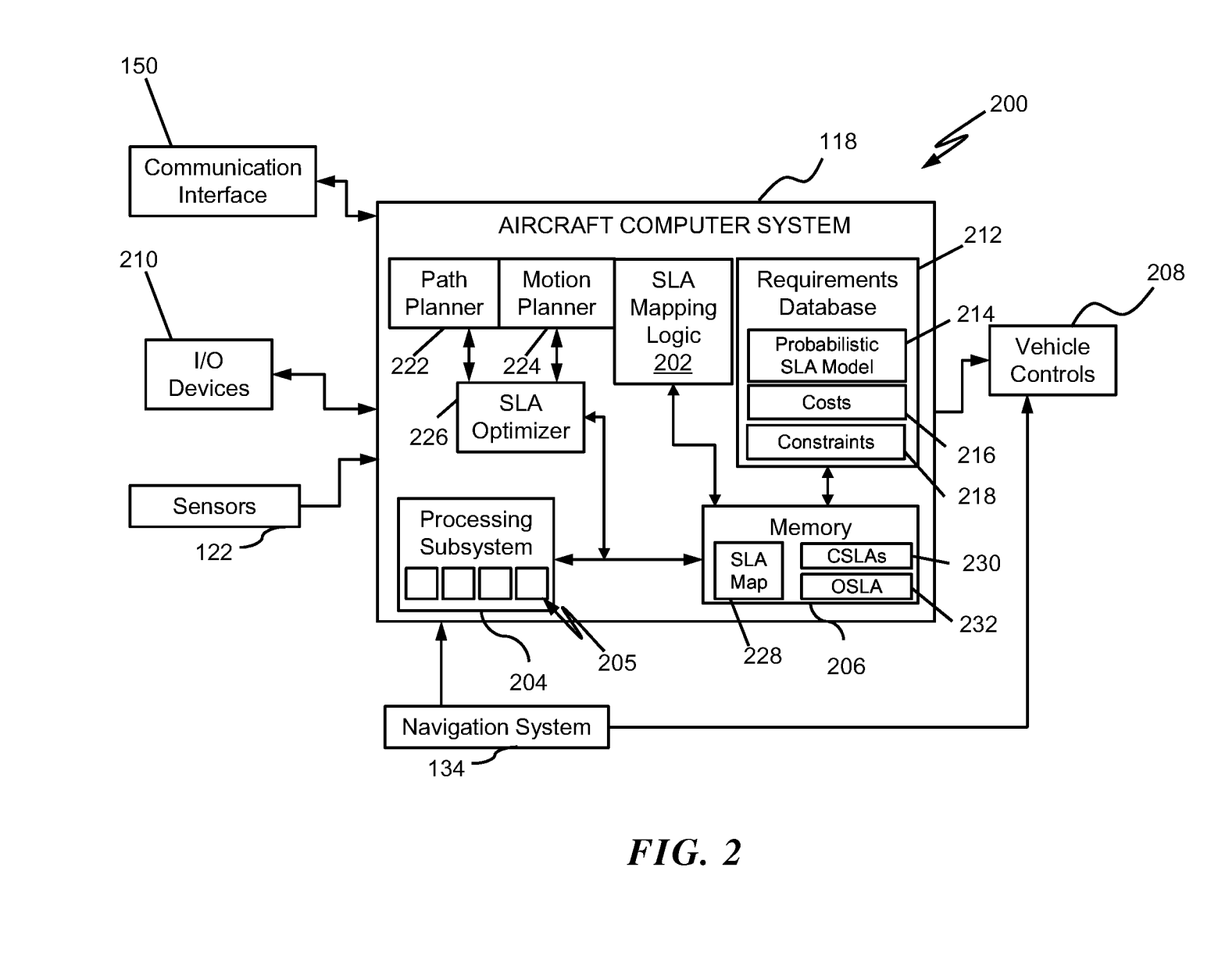
FIG. 2 is a schematic view of an exemplary computing system according to an embodiment of the invention.

FIG. 2 illustrates a schematic block diagram of a system 200 for optimal SLA determination onboard the autonomous UAV 100 of FIG. 1 according to an exemplary embodiment. The system 200 is an embodiment of the SLA determination system 106 of FIG. 1. As illustrated, the system 200 includes the aircraft computer system 118 that executes instructions for implementing SLA mapping logic 202, a path planner 220, a motion planner 224, and a SLA optimizer 226. The aircraft computer system 118 receives sensor data indicative of current conditions at potential landing areas 132 of FIG. 1 from one or more sensors 122. As depicted in FIG. 2, the aircraft computer system 118 includes a memory 206 that communicates with a processing subsystem 204. The memory 206 may store the SLA mapping logic 202, path planner 220, motion planner 224, and/or SLA optimizer 226 as executable instructions that are executed by the processing subsystem 204. The memory 206 is an example of a non-transitory computer readable storage medium tangibly embodied in the aircraft computer system 118 including executable instructions stored therein, for instance, as firmware. Also, in embodiments, memory 206 may include random access memory (RAM), read-only memory (ROM), or other electronic, optical, magnetic or any other computer readable medium onto which instructions and data are stored. Accordingly, the memory 206 may also hold various data values, such as a SLA map 228, candidate SLAs 230, an indicator of an optimal SLA 232, and/or other values to support optimal SLA determination.

The processing subsystem 204 may include any number and type of processors, including a general purpose processor, a digital signal processor, a microcontroller, an application specific integrated circuit, a field programmable gate array, or the like. In an exemplary embodiment, the processing subsystem 204 includes a plurality of processing resources 205, which may be separate cores, processing circuits, and/or processors supporting parallel computing. Although depicted as singular blocks, the processing subsystem 204 and memory 206 can be distributed between multiple processing circuits and memory subsystems. In an embodiment, the processing subsystem 204 performs additional processing tasks for the system 200.

The system 200 may include a requirements database 212. The requirements database 212 may be used to store a probabilistic SLA model 214, costs 216, constraints 218, and the like. The probabilistic SLA model 214 can define probabilities that terrain features are suitable for safe landing of the autonomous UAV 100 of FIG. 1. The costs 216 may define mission-level cost details, such as costs associated distances, time, fuel consumption, and on-ground activity after landing. For example, a cost-per-unit of time or distance may be defined on a geographic basis or according to a multi-variable lookup table based on maneuver type, altitude change, environmental factors, and the like. Ground-based activity, such as expected cost-per-unit time or distance once the autonomous UAV 100 of FIG. 1 has landed, for an individual at the targeted location 146 of FIG. 1 to reach the autonomous UAV 100 of FIG. 1 can also be captured in the costs 216.

The constraints 218 may define a variety of limits associated with the mission and/or the autonomous UAV 100 of FIG. 1. For example, the constraints 218 can include a bounding box or range relative to the targeted location 146 of FIG. 1 to limit analysis of the potential landing areas 132 of FIG. 1. The constraints 218 may also include limits of maneuverability of the autonomous UAV 100 of FIG. 1. The constraints 218 may further include one or more of: geometric constraints around the targeted location 146 of FIG. 1, a minimum confidence level threshold for the candidate safe landing areas 140 of FIG. 1, and/or dynamic feasibility for the autonomous UAV 100 of FIG. 1 to reach the candidate safe landing areas 140 of FIG. 1. Geometric constraints can include no-fly zones 142 of FIG. 1 and/or safe landing obstacles 144 of FIG. 1. A minimum confidence level threshold can define a safety threshold for a safe landing area as minimum for considering one or the potential landing areas 132 of FIG. 1 as one of the candidate safe landing areas 140 of FIG. 1. If there is no direct feasible path to at least one of the candidate safe landing areas 140 of FIG. 1, a dynamic feasibility constraint can define an acceptable level of unfeasibility to limit how far away from a path node that the candidate safe landing areas 140 of FIG. 1 can be located and still considered.

The data stored in the requirements database 212 may be based on one or more other algorithms or processes for implementing the SLA mapping logic 202, path planner 220, motion planner 224, and/or SLA optimizer 226. For example, in some embodiments data stored in the requirements database 212 may be a result of the processing subsystem 204 having subjected data received from the sensors 122 and other sensors (not depicted) to one or more filtration processes. The requirements database 212 may be used for any number of reasons. For example, the requirements database 212 may be used to temporarily or permanently store data, to provide a record or log of the data stored therein for subsequent examination or analysis, etc. In some embodiments, the requirements database 212 may store a relationship between data, such as one or more links between data or sets of data acquired through the modalities onboard the autonomous UAV 100 of FIG. 1.

The system 200 may provide one or more controls, such as vehicle controls 208. The vehicle controls 208 may provide directives based on, e.g., data associated with the navigation system 134. Directives provided by the vehicle controls 208 may include navigating or positioning the autonomous UAV 100 of FIG. 1 to a safe landing area. The directives may be presented on one or more input/output (I/O) devices 210. The I/O devices 210 may include a display device or screen, audio speakers, a graphical user interface (GUI), etc. In some embodiments, the I/O devices 210 may be used to enter or adjust a linking between data or sets of data. It is to be appreciated that the system 200 is illustrative. In some embodiments, additional components or entities not shown in FIG. 2 may be included. In some embodiments, one or more of the components or entities may be optional. In some embodiments, the components or entities of the system 200 may be arranged or configured differently from what is shown in FIG. 2. For example, in some embodiments the I/O device(s) 210 may be commanded by vehicle controls 208, as opposed to being commanded by the processing subsystem 204.

Figure 3:
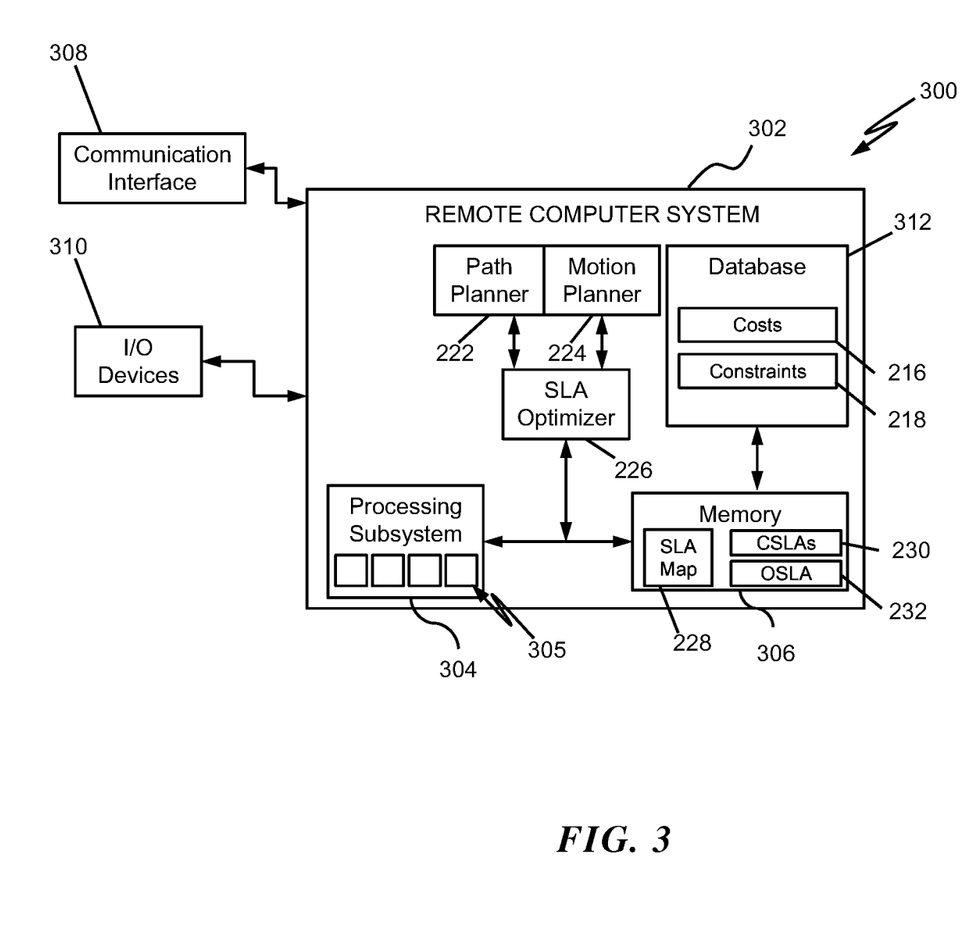
FIG. 3 is a schematic view of another exemplary computing system according to an embodiment of the invention.

FIG. 3 is a schematic view of a system 300 according to an embodiment. The system 300 includes a remote computer system 302 as an embodiment of the remote computer system 148 of FIG. 1, which may be a ground control station operable to communicate with the autonomous UAV 100 of FIG. 1. The remote computer system 302 includes a processing subsystem 304 as an embodiment of the processing subsystem 152 of FIG. 1. Similar to the processing subsystem 204 of FIG. 2, the processing subsystem 304 may also include a plurality of processing resources 305, such as processing cores, processing circuits, and/or processors. Also similar to the aircraft computer system 118 of FIG. 1, the remote computer system 302 can include memory 306, a communication interface 308, I/O devices 310, and a database 312. The remote computer system 302 is depicted in FIG. 3 as including the costs 216, constraints 218, path planner 222, motion planner 224, SLA optimizer 226, SLA map 228, candidate SLAs 230, and optimal SLA 232 of FIG. 2.

In one embodiment, the remote computer system 302 receives the SLA map 228 from the aircraft computer system 118 of FIG. 2, performs SLA optimization, and returns the optimal SLA 232 to the aircraft computer system 118 of FIG. 2. In such an embodiment, the SLA optimizer 226 can be omitted from the aircraft computer system 118 of FIG. 2. In an alternate embodiment, the optimization is a distributed task, where a portion can be performed on the aircraft computer system 118 of FIG. 2 and another portion can be performed by the remote computer system 302. In a further alternate embodiment, the remote computer system 302 is used to update the costs 216 and constraints 218, select one or more of the costs 216 and constraints 218 for optimization using the I/O devices 310, and send the updates and selections to the aircraft computer system 118. As a further alternative, the remote computer system 302 need not be involved in SLA optimization where sufficient capability is implemented in the aircraft computer system 118 of FIG. 2.

Figure 4:
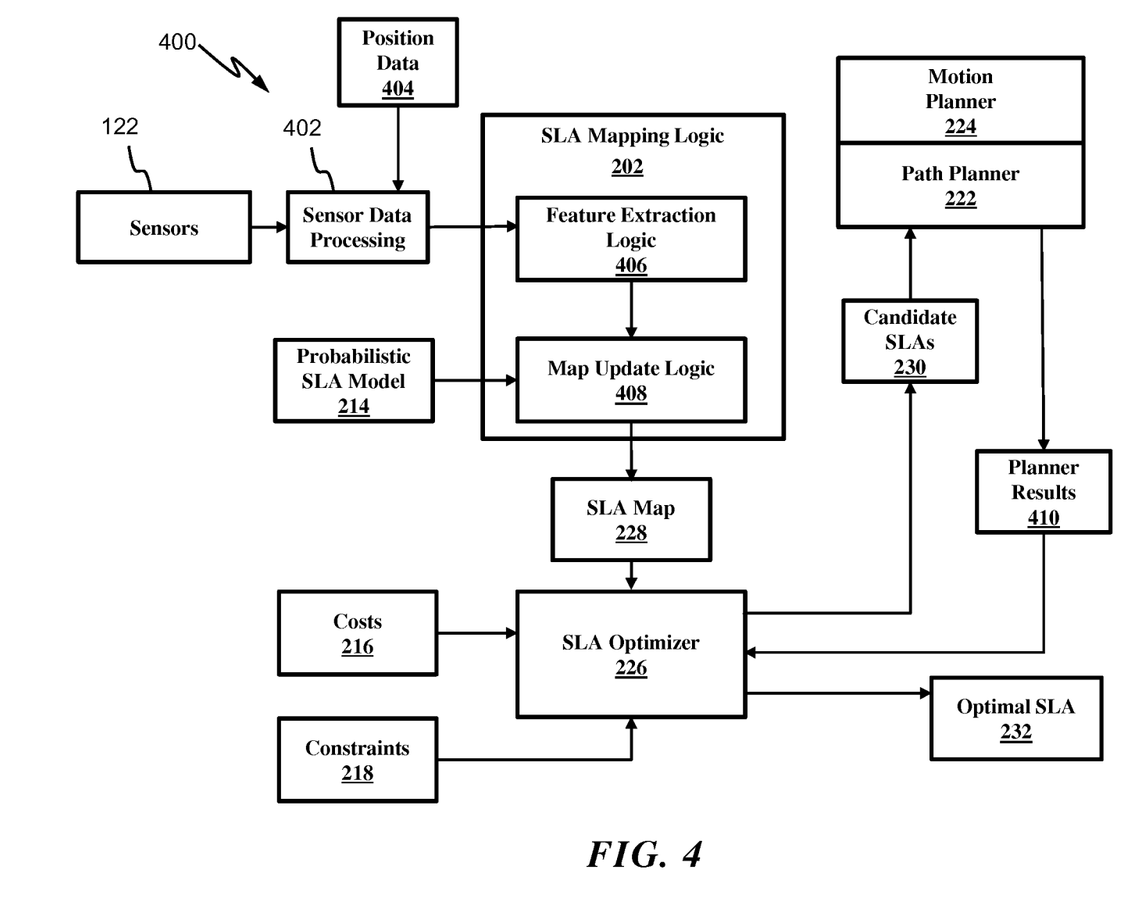
FIG. 4 illustrates a dataflow diagram for optimal safe landing area determination according to an embodiment of the invention.

FIG. 4 illustrates an exemplary data flow diagram 400 that can be performed by the processing subsystem 204 of FIG. 2 independently or in conjunction with the processing subsystem 304 of FIG. 3. Sensor data indicative of current conditions at potential landing areas 132 of FIG. 1 for the autonomous UAV 100 of FIG. 1 are received at sensor data processing 402 from the sensors 122. The sensor data processing 402 may also receive position data 404, for example, from the navigation system 134 of FIGS. 1 and 2. The position data 404 received for the autonomous UAV 100 of FIG. 1 may be used to determine positions of the potential landing areas 132 of FIG. 1 and the autonomous UAV 100 of FIG. 1. The sensor data from the sensors 122 can be correlated to the position data 404 to determine physical alignment between sensor data and geospatial positions of the geospatial grid 136 of FIG. 1. In an exemplary embodiment, the SLA mapping logic 202 includes feature extraction logic 406 and map update logic 408 to produce the SLA map 228.

The sensor data processing 402 can provide the sensor data to the feature extraction logic 406. The feature extraction logic 406 performs feature extraction on the sensor data. The feature extraction logic 406 may perform known detection techniques to identify or filter out features. For example, pattern matching using a scale-invariant feature transform can search for specific shapes. Depth data can be checked for substantial uniformity over geospatial locations. Data sets defining planes over the same geospatial area can be used for feature extraction and increased confidence in safe landing zone vs. unsafe landing zone determinations. For instance, a road may visually have a substantially rectangular appearance defined by observed edges and may have a substantially smooth surface defined by depth measurements. Using a grid, such as the geospatial grid 136 of FIG. 1, data processing in the processing subsystem 204 of FIG. 2 can be partitioned according to the cells 138 of FIG. 1 as separate observation areas for analysis. Accordingly, as sensor data for the cells 138 of FIG. 1 are collected over a period of time, values such as slope and variance feature values of the cells 138 of FIG. 1 can be computed.

The map update logic 408 can generate and update the SLA map 228 based on comparing extracted features of the sensor data with the probabilistic SLA model 214. Probabilistic values in the SLA map 228 may be updated using a Bayesian inference relative to features extracted from the sensor data. The SLA optimizer 226 can access the SLA map 228 to analyze and compare probabilistic indicators of safe landing areas for the autonomous UAV 100 of FIG. 1. The SLA optimizer 226 can be implemented in the aircraft computer system 118 of FIG. 1, in the remote computer system 148 of FIG. 1, or be distributed between systems 118 and 148 of FIG. 1. When implemented in the aircraft computer system 118 of FIG. 1, the processing subsystem 204 including one or more processing resources 205 of FIG. 2 can generate a list of candidate SLAs 230 based on the SLA map 228 and one or more constraints 218 and/or costs 216. In an embodiment, the analysis and comparisons of the probabilistic indicators of the SLA map 228 and the constraints 218 and/or costs 216 may be distributed between the processing resources 205 of FIG. 2 and performed in parallel between the processing resources 205 of FIG. 2, as each of the cells 138 of FIG. 1 may be statistically independent.

The SLA optimizer 226 can provide at least two of the candidate SLAs 230 to the path planner 222. For example, the candidate SLAs 230 can be provided to the path planner 222 as a single multi-goal query, such that a single path-tree is generated once for all of the candidate SLAs 230. The path planner 222 may work in conjunction with motion planner 224 to produce planner results 410. The SLA optimizer 226 can rank the list of candidate SLAs 230 based on the planner results 410, which can include estimated costs to reach each of the candidate SLAs 230. The estimated cost to reach each of the candidate SLAs 230 can be defined as one or more of: an estimated distance, an estimated time, an estimated amount of fuel consumption, and a likelihood of safe landing. Based on the ranking, the SLA optimizer 226 can output an indicator of the optimal SLA 232 as a desired landing location for the autonomous UAV 100 of FIG. 1.

The costs 216 and constraints 218 can be mission and/or vehicle level costs and constraints. For example, mission objectives in the constraints 218 can define accessibility limits, such as an acceptable minimum level of terrain flatness. The constraints 218 can also identify the targeted location 146 of FIG. 1 as well as any known constraints at the targeted location 146 of FIG. 1. Further mission constraints can include setting a minimum travel and/or landing distance from the no-fly zones 142, safe landing obstacles 144, and/or the targeted location 146 of FIG. 1. Limitations in mission costs can define a maximum amount of fuel, time, and/or distance that can be considered. Vehicle constraints can include, a minimum and maximum altitude, velocity, turn radius, a minimal spatial clearance, etc. The costs 216 and/or constraints 218 can be applied to selecting the candidate SLAs 230 before and/or after the planner results 410 are received. The path planner 222 and/or motion planner 224 may also have access to all or a portion of the costs 216 and constraints 218, either by direct access or as query parameters. The planner results 410 can further include paths to the candidate SLAs 230. Where no path is found to one of the candidate SLAs 230, the planner results 410 may indicate how far off path an unreachable candidate SLA was from a closest node of the path. This may be used to alter the list of candidate SLAs 230 to consider another one of the potential landing areas 132 of FIG. 1 with a greater likelihood of being reachable.

Figure 5:
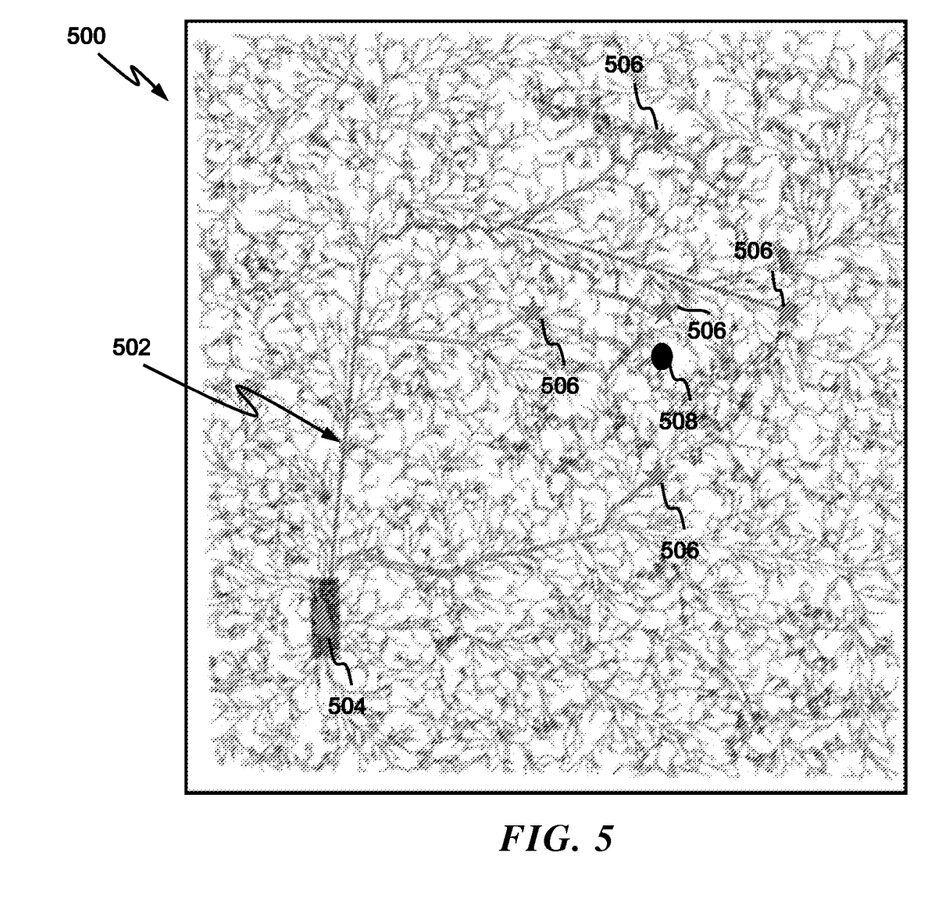
FIG. 5 illustrates an example of various paths to plurality of candidate safe landing areas according to an embodiment of the invention.

FIG. 5 illustrates an example of various paths 500 to plurality of candidate safe landing areas according to an embodiment. The path planner 222 of FIGS. 2-4 can use a one or more path planning algorithms to identify a shortest feasible path 502 from a current position 504 of the autonomous UAV 100 of FIG. 1 to each of a plurality of candidate SLAs 506. The path planner 222 of FIGS. 2-4 can perform sample-based planning to construct a graph or tree that represents feasible paths to the candidate SLAs 506. The paths 500 can be a single path-tree that is generated once for all of the candidate SLAs 506 based on a multi-goal query.

One or more cost functions can be considered to determine estimated costs for each of the paths 500. The cost functions can also consider post-landing costs (e.g., estimated distance, estimated travel time, estimated level of risk, estimated terrain complexity, etc.) for traversing between each of the candidate SLAs 506 and a targeted location 508. Consideration of both flight-based costs on the paths 500 and secondary costs, e.g., ground-based costs, can be used to select which of the candidate SLAs 506 is an optimal SLA with respect to the targeted location 508.

Technical effects include performing an optimal safe landing area determination for an aircraft. The optimal safe landing area can be used to guide the aircraft on an associated path in order to reach a best determined landing area in proximity to a targeted location.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of performing an optimal safe landing area determination for an aircraft, the method comprising:
   accessing a probabilistic safe landing area map comprising a plurality of probabilistic indicators of safe landing areas for the aircraft;
   receiving sensor data indicative of current conditions at potential landing areas for the aircraft;
   performing feature extraction on the sensor data;
   performing geospatial partitioning of the senor data to subdivide processing of the sensor data into a plurality of cells;
   collecting sensor data for the cells over a period of time
   computing slope and variance feature values of the cells based on the sensor data that are collected over the period of time;
   comparing the slope and variance feature values with a probabilistic safe landing area model to update the probabilistic landing area map;
   generating, by a processing subsystem comprising one or more processing resources, a list of candidate safe landing areas based on the probabilistic safe landing area map and one or more constraints;
   providing at least two of the candidate safe landing areas to a path planner;
   ranking the list of candidate safe landing areas based on results from the path planner indicating an estimated cost to reach each of the candidate safe landing areas; and
   based on the ranking, outputting an indicator of an optimal safe landing area as a desired landing location for the aircraft.

2. The method of claim 1, wherein the one or more constraints comprise one or more of: mission-level constraints and vehicle constraints.

3. The method of claim 2, wherein generating the list of candidate safe landing areas is further based on mission-level costs, the mission-level costs and the mission-level constraints comprise costs and constraints for the aircraft to traverse a path and for reaching a targeted location after the aircraft has landed.

4. The method of claim 3, wherein the one or more constraints further comprise one or more of:
geometric constraints around the targeted location; and
a minimum confidence level threshold for the candidate safe landing areas.

5. The method of claim 1, wherein the estimated cost to reach each of the candidate safe landing areas is defined as one or more of: an estimated distance, an estimated time, an estimated amount of fuel consumption, and a likelihood of safe landing.

6. The method of claim 1, wherein generating the list of candidate safe landing areas further comprises distributing analysis and comparisons of the probabilistic indicators of the safe landing areas and the one or more constraints between a plurality of the processing resources; and
performing the analysis and comparisons of the probabilistic indicators of the safe landing areas and the one or more constraints for multiple safe landing areas in parallel between the processing resources.

7. The method of claim 1, wherein the candidate safe landing areas are provided to the path planner as a single multi-goal query, such that a single path-tree is generated once for all of the candidate safe landing areas.

8. The method of claim 1, further comprising:
receiving position data for the aircraft;
determining positions of the potential landing areas and the aircraft based on the position data; and
correlating the sensor data to the position data.

9. A system for performing an optimal safe landing area determination for an aircraft, the system comprising:
a processing subsystem; and
memory having instructions stored thereon that, when executed by the processing subsystem, cause the system to:
access a probabilistic safe landing area map comprising a plurality of probabilistic indicators of safe landing areas for the aircraft;
receive sensor data indicative of current conditions at potential landing areas for the aircraft;
perform feature extraction on the sensor data;
performing geospatial partitioning of the sensor data to subdivide processing of the sensor data into a plurality of cells;
collecting sensor data for the cells over a period of time;
computing slope and variance feature values of the cells based on the sensor data that are collected over the period of time;
compare the slope and the variance feature values with a probabilistic safe landing area model to update the probabilistic landing area map;
generate a list of candidate safe landing areas based on the probabilistic safe landing area map and one or more constraints;
provide at least two of the candidate safe landing areas to a path planner;
rank the list of candidate safe landing areas based on results from the path planner indicating an estimated cost to reach each of the candidate safe landing areas; and
based on the rank, output an indicator of an optimal safe landing area as a desired landing location for the aircraft.

10. The system of claim 9, wherein the one or more constraints comprise one or more of: mission-level constraints and vehicle constraints, and the estimated cost to reach each of the candidate safe landing areas is defined as one or more of: an estimated distance, an estimated time, an estimated amount of fuel consumption, and a likelihood of safe landing.

11. The system of claim 10, wherein the list of candidate safe landing areas is further based on mission-level costs, the mission-level costs and the mission-level constraints comprise costs and constraints for the aircraft to traverse a path and for reaching a targeted location after the aircraft has landed.

12. The system of claim 11, wherein the one or more constraints further comprise one or more of:
geometric constraints around the targeted location; and
a minimum confidence level threshold for the candidate safe landing areas.

13. The system of claim 9, wherein generation of the list of candidate safe landing areas further comprises distributing analysis and comparisons of the probabilistic indicators of the safe landing areas and the one or more constraints between a plurality of processing resources; and
performing the analysis and comparisons of the probabilistic indicators of the safe landing areas and the one or more constraints for multiple safe landing areas in parallel between the processing resources.

14. The system of claim 9, wherein the candidate safe landing areas are provided to the path planner as a single multi-goal query, such that a single path-tree is generated once for all of the candidate safe landing areas.

* * * * *